N. Spofford,
Bit Stock.
No 2,576. Reissued Apr. 23, 1867.
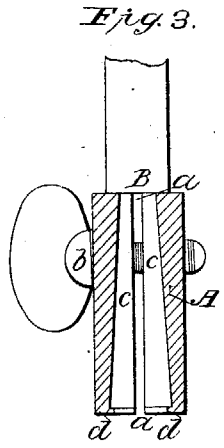
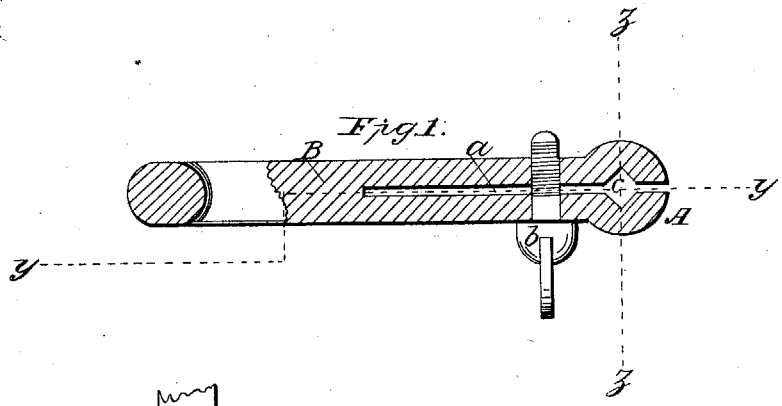
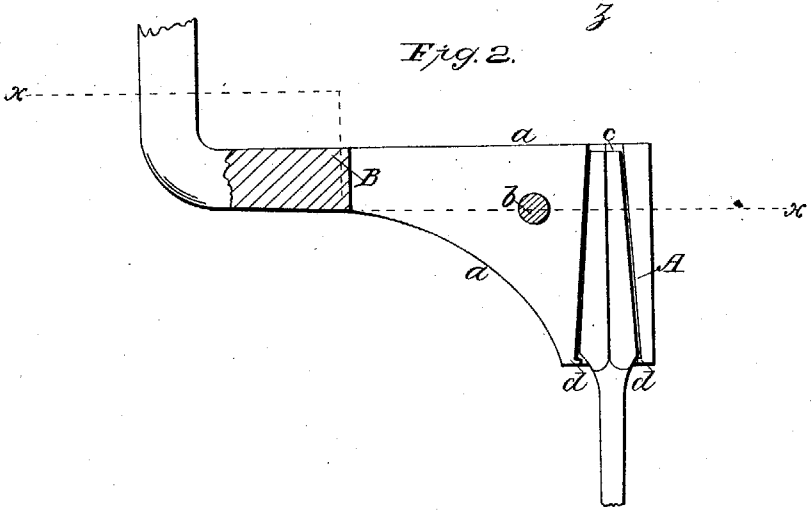
Witnesses.
John Breston.
John P. Bradstreet.
Inventor.
N. Spofford.
AM. PHOTO-LITHO. CO. N.Y. (OSBORNE'S PROCESS)

United States Patent Office.

N. SPOFFORD, OF HAVERHILL, MASSACHUSETTS.

*Letters Patent No* 25,984, *dated November* 1, 1859; *reissue No.* 2,576, *dated April* 23, 1867.

IMPROVEMENT IN BRACES FOR BITS.

The Schedule referred to in these Letters Patent and making part of the same.

TO ALL WHOM IT MAY CONCERN:

Be it known that I, N. SPOFFORD, of Haverhill, in the county of Essex, and State of Massachusetts, have invented a new and improved Mode of Fastening Bits in Braces; and I do hereby declare that the following is a full, clear, and exact description of the same, reference being had to the accompanying drawings, forming a part of this specification, in which—

Figure 1 represents a horizontal section of my invention, the line *x x*, fig. 2, indicating the plane of section.

Figure 2 is a longitudinal vertical section of ditto taken in the plane indicated by the line *y y*, fig. 1.

Figure 3 is a transverse vertical section of ditto, the line *z z*, fig. 1, indicating the plane of section.

Similar letters of reference in the three figures indicate corresponding parts.

This invention consists in arranging the socket of a brace with a slot that extends a certain distance into the arm of the brace, dividing said socket diagonally into two parts, which are forced together by means of a thumb-screw, so that the same accommodates itself to different sizes and different bevels of the shanks of bits, the lower end of said socket being furnished with an inward projecting lip that serves to retain the bit, even with quite a moderate pressure of the thumb-screw.

To enable others skilled in the art to make and use this invention, I will proceed to describe it.

The socket A of the brace, and the arm B to which it is attached, are made of steel. A slot, *a*, is cut into it, and divides said socket from corner to corner into two jaws, which are forced together by a thumb-screw, *b*. The arm B and the socket A are tempered, so that on relaxing the screw the jaws recede and resume their original position. The socket is formed by a four-sided hole, *c*, perfectly smooth from the top nearly to the bottom, and tapering so as to fit the usual taper of the shanks of bits. The lower or larger end of the hole is furnished with a lip, *d*, projecting inward, and so low that the bit can be inserted quite freely when the thumb-screw is turned back, but sufficiently high to retain the bit when the thumb-screw is turned on. The shank of the bit is passed up into the socket A until its tapered head is entirely beyond the projection *d*, and the thumb-screw is turned on. The two jaws of the socket accommodate themselves to the bevel of the shank, and the bit is retained perfectly secure. No notch or spring is required; and it must be remarked that the bevel of the shanks may differ considerably, and still, by turning up the thumb-screw, the jaws will spring sufficiently to adapt themselves to each shank equally well, and the bit will be retained perfectly secure. With my brace, therefore, it is not at all necessary to bestow particular care in making all the shanks of the bits exactly of the same size or of the same bevel, whereas with the common brace each shank has to fit exactly into the socket of the brace in order to be able to retain the bit firmly. The shank of each bit has also to be furnished with a notch to accommodate a latch which retains it in the socket, whereas with my brace the projection *d* serves for all sizes of bits adapted to the capacity of the stock, so that the labor which has to be bestowed on the bits in order to make them fit the brace is considerably reduced if not entirely avoided.

Having thus fully described my invention, what I claim as new, and desire to secure by Letters Patent, is—

1. A bit-stock constructed with a tapered socket transverse to the arm or portion of the stock in which it is formed, and said arm slitted along its centre line so as to divide said socket lengthwise into two equal parts to form an expanding socket, substantially as and for the purpose described.

2. The slitted socket A, constructed with the inward projections or lips *d d* at its larger end, to close over the shoulders of the bit-shank for the purpose of retaining said shank within the socket when clamped, substantially as set forth.

3. Arranging the socket A of a brace with a slot, *a*, as described, in combination with a thumb-screw, D, and slips or projections *d* or their equivalents, substantially as and for the purpose set forth.

N. SPOFFORD.

Witnesses:

JER. P. JONES,

PHINEAS E. DAVIS.